US009147160B2

(12) United States Patent
Nogin

(10) Patent No.: US 9,147,160 B2
(45) Date of Patent: Sep. 29, 2015

(54) SYSTEM AND METHOD FOR ASYNCHRONOUS EXPLANATION AND PROPAGATION-BASED CONSTRAINT SOLVING

(71) Applicant: Raytheon Company, Waltham, MA (US)

(72) Inventor: Aleksey Nogin, Fresno, CA (US)

(73) Assignee: Raytheon Company, Waltham, MA (US)

( * ) Notice: Subject to any disclaimer, the term of this patent is extended or adjusted under 35 U.S.C. 154(b) by 279 days.

(21) Appl. No.: 13/744,657

(22) Filed: Jan. 18, 2013

(65) Prior Publication Data

US 2014/0207720 A1    Jul. 24, 2014

(51) Int. Cl.
*G06N 5/02*  (2006.01)
*G06N 99/00* (2010.01)
*G06N 5/00*  (2006.01)
*G06F 17/10* (2006.01)

(52) U.S. Cl.
CPC ........ *G06N 5/02* (2013.01); *G06F 17/10* (2013.01); *G06N 5/003* (2013.01)

(58) Field of Classification Search
None
See application file for complete search history.

(56) References Cited

U.S. PATENT DOCUMENTS

| 6,529,934 B1* | 3/2003 | Kawamura et al. ........ 718/102 |
| 2007/0094174 A1* | 4/2007 | Hamadi et al. ............. 706/19 |

OTHER PUBLICATIONS

Sycara, K., et al. "Distributed constrained heuristic search." Systems, Man and Cybernetics, IEEE Transactions on 21.6 (1991): pp. 1446-1461.*

Jussien, N., et al. "A best first approach for solving over-constrained dynamic problems." IJCAI'97. 1997.*
Mailler, R., et al. "Asynchronous Partial Overlay: A New Algorithm for Solving Distributed Constraint Satisfaction Problems." J. Artif. Intell. Res.(JAIR) 25 (2006): pp. 529-576.*
Dubois, D., et al. "Possibility theory in constraint satisfaction problems: Handling priority, preference and uncertainty." Applied Intelligence 6.4 (1996): 287-309.*
Jussien, Narendra, et al., "A Best First approach for solving over-constrained dynamic problems", Ecole des Mines de Nantes, 11 pgs.
Schiex, Thomas, et al., "Nogood Recording for Static and Dynamic Constraint Satisfaction Problems", Extended release of [SV93a] appears in Proc. of the 5th International Conference on Tools with Artificial Intelligence, 16 pgs.

* cited by examiner

*Primary Examiner* — Kakali Chaki
*Assistant Examiner* — Eric Nilsson
(74) *Attorney, Agent, or Firm* — Schwegman Lundberg & Woessner, P.A.

(57) ABSTRACT

Embodiments of a system and method for asynchronous explanation and explanation-based constraint problem solving are generally described herein. In one or more embodiments, an apparatus includes an asynchronous constraint satisfaction problem solving module (ACSPSM), the ACSPSM can be executable by one or more processors. The ACSPSM can be configured to propagate at least one constraint to a plurality of variables by reducing a speculative propagation range of a first variable when a first value in the speculative propagation range of the first variable is in conflict with the constraint. The ACSPSM can be configured to update an explanation for the reduction in the speculative propagation range of the first variable, or backtrack when a choice of a second value for a second variable would result in the speculative propagation range of the first variable becoming empty. The ACSPSM can be multi-threaded.

20 Claims, 6 Drawing Sheets

SYSTEM AND METHOD FOR ASYNCHRONOUS EXPLANATION AND PROPAGATION-BASED CONSTRAINT SOLVING

TECHNICAL FIELD

This disclosure relates generally to methods and systems for solving constraint-based problems.

BACKGROUND ART

Constraint satisfaction problems are mathematical or computer programming problems defined as a set of objects whose state must satisfy a number of constraints or limitations. Constraint satisfaction problems are the subject of research, since the regularity in their formulation provides a common basis to analyze and solve problems of many families of problems. Constraint satisfaction problems often exhibit high complexity and may use heuristics and combinatorial search methods to solve the problems. The complexity of constraint satisfaction problems can make it difficult to solve the problems efficiently or using multiple threads.

DESCRIPTION OF EMBODIMENTS

Figure 1:
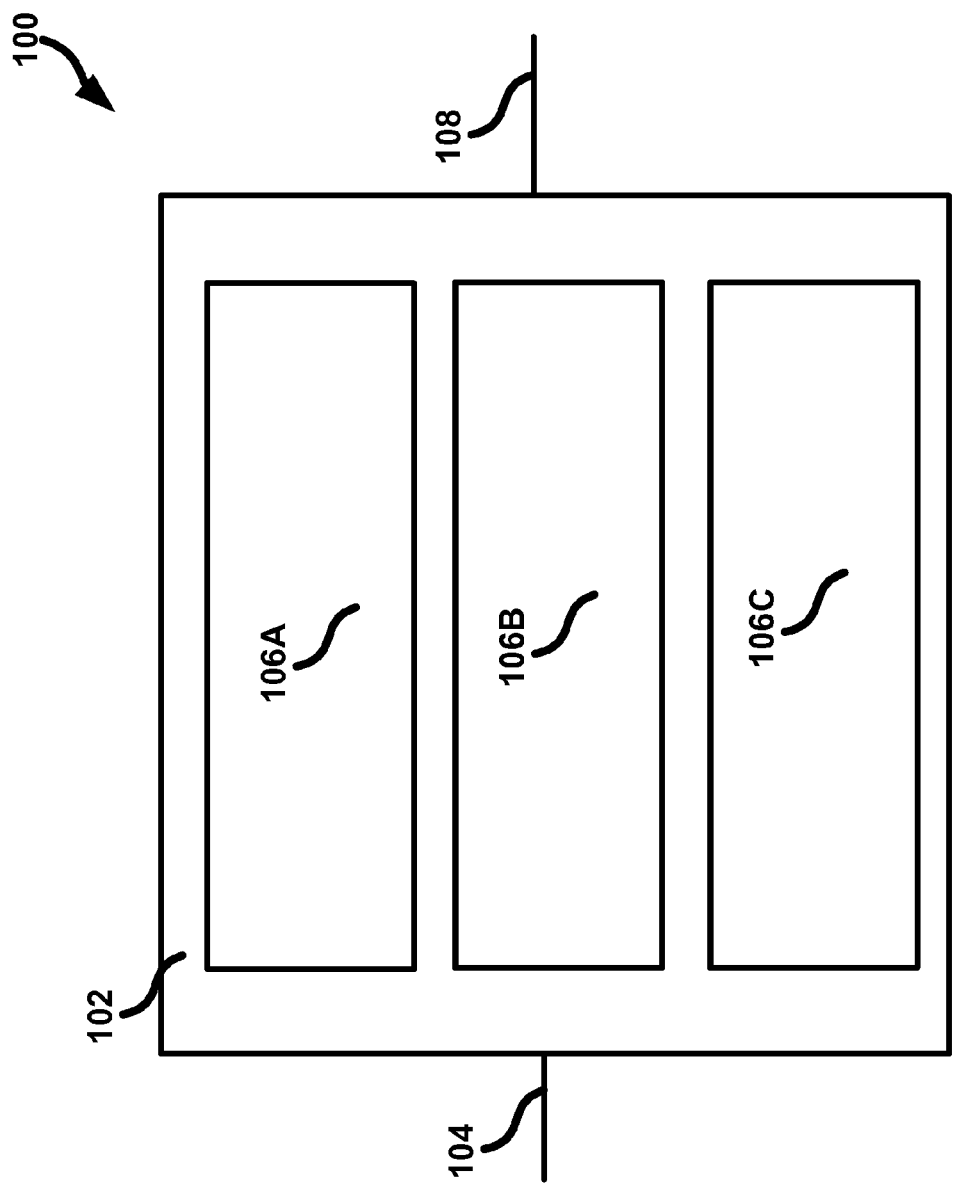
FIG. 1 illustrates a logical block diagram of an example of an asynchronous constraint satisfaction problem solving module.

In the following detailed description, reference is made to the accompanying drawings that form a part hereof, and in which is shown by way of illustration specific embodiments in which the inventive subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to limit the scope of this application to any single invention or inventive concept if more than one is in fact disclosed. The following description is, therefore, not to be taken in a limited sense, and the scope of the inventive subject matter is defined by the appended claims.

Embodiments of a system and method for asynchronous explanation and explanation-based constraint problem solving are generally described herein. In one or more embodiments, an apparatus comprises an asynchronous constraint satisfaction problem solving module (ACSPSM), the ACSPSM can be executable by one or more processors. The ACSPSM can be configured to propagate at least one constraint to a plurality of variables, such as in a first thread, by reducing a speculative propagation range (a subset of all possible values) of a first variable when a first value in the speculative propagation range of the first variable is in conflict with the constraint. The ACSPSM can be configured to, such as in a second thread, update an explanation for the reduction in the speculative propagation range of the first variable, or backtrack when a choice of a second value for a second variable would result in the speculative propagation range of the first variable becoming the empty set.

A problem associated with constraint-based problem solving algorithms is the algorithms may include inefficiencies in backtracking when a portion of a tree of possible solutions is found to not solve the problem. Another possible problem can include an inability to handle constraints that change while a constraint-based problem solving algorithm is running. Another possible problem can include an inability to execute the algorithm using multiple threads because of the synchronous or centralized nature of the algorithm.

A possible solution to at least one problem presented by constraint-based problem solving algorithms may include providing a constraint-based problem solving algorithm that uses an explanation-based, decentralized approach to search and optimization. A constraint-based problem solving algorithm may be provided that is asynchronous by using a propagation-based approach to constraint satisfaction and an explanation-based approach to search and optimization.

Overview

Generally speaking, a class of problems that can be solved using systems and methods of the disclosure can be described as a constraint satisfaction and, optionally, optimization problem. Such a problem includes a complete set of variables (e.g., domains). Each variable includes a set of values that includes at least one value, the value can be a possible solution value for the corresponding variable. The set can be called an initial range of the variable. An initial range may represent an "arbitrary" set of values such as data types, a numerical range(s), combinations thereof, or the like.

The problem can include at least one constraint. Each constraint relates to a set of variables that is a subset of the complete set of variables. A constraint states which assignments to variables it would agree with (e.g., a constraint is a subset of possible assignments for the subset of variables). For example, the constraint x=y relates to the variables x and y and can be interpreted as prohibiting any variable assignment where different values are assigned to the two variables. Optionally, there may be a heuristic (e.g., a secondary value function) that allows choosing a preferred solution among those solutions that would otherwise be considered of equal quality or value. An example of a heuristic can be a preference for tasks that can execute sooner rather than later. In an online scheduling algorithm it can be preferred to have tasks scheduled earlier rather than later so that the tasks can be completed sooner and, potentially, more resources may be available for tasks that suddenly arrive.

A solution to a constraint satisfaction problem is an assignment of a value from the initial range of each variable to each variable, respectively, such that a constraint is satisfied. Optimally all constraints will be satisfied, but this is not always possible, so sometimes it can be beneficial to find a "best" solution, such as a solution based on an optional heuristic.

Constraints can be enforced by "propagators." In general, a propagator is a function that reacts to a reduction in a range (e.g., search range or speculative propagation range) of a variable by producing corresponding range reductions for other variables when the constraints or heuristic dictate that such reductions should occur. The propagators can be configured to function properly when search or speculative propagation ranges of a variable are reset back to include more values such as can happen when a choice made for a value of a variable is taken back through a backtracking process. The propagators can be configured to be prohibited from storing possible values for variables and prevented from assuming previously ruled out values never come back, or configured to manage storage in a fashion that allows the stored possible values for variables to be altered.

A constraint can be assigned a priority level (e.g., a numerical value corresponding to the importance of the constraint being satisfied). Satisfying a single constraint with a higher priority can be considered more important than satisfying any combination of constraints with a lower priority. There may be several different and possibly unrelated constraints (e.g., constraints that do not relate to a common variable) that have the same priority level. One goal could be to maximize the number of constraints that are satisfied at the highest priority level. Another goal could be to maximize constraints such that the sum of the priority levels of the satisfied constraints is maximized. Many other goals can be realized and implemented.

The plurality of variables can be subdivided into categories. For example, when the goal is to maximize the number of constraints that are satisfied at the highest priority level the variables can be subdivided into three categories: 1) variables related to constraints with the highest priority level; 2) variables with values that are preferred based on a heuristic; and 3) all other variables.

A variable can be restricted to a smaller range than the initial range of the variable by propagators enforcing one or more constraints or by a search process making an "arbitrary" choice (e.g., a choice of a value for a variable that is made voluntarily as opposed to being forced by constraints, the choice may take into consideration a priority level or a heuristic, which is why "arbitrary" is in quotes). An "arbitrary" choice may turn out to be infeasible and may need to be taken back. Taking back an "arbitrary" choice is also called "backtracking" herein. In order to keep track of the consequences of the "arbitrary" choices the initial range, choice status, search range, and speculative propagation range for each variable can be recorded.

The choice status is an indicator of whether the variable is the subject of an "arbitrary" choice.

The search range can be a subset of the initial range as reduced by a constraint propagation process. The search range can include a corresponding search range explanation that indicates a reason for the reduction in the initial range that led to the current state of the search range. The search range explanation can be limited to contain only variables related to higher priority levels. At or around the time a conflict between "arbitrary" choices is detected, one of the choices can be taken back and the corresponding value can be removed from the search range of the corresponding variable. The set of all other domains that were involved in the conflicts can be recorded in the search range explanation. The search range can maintain the progress of a search process and can be a strictly decreasing set.

The speculative propagation range is a subset of the search range that includes a speculative propagation range explanation of how the search range was reduced to the speculative propagation range by propagators. When a propagator narrows a speculative propagation range, the explanation of the speculative propagation range is extended to include all the explanations of the propagator's input (e.g., a history of the propagator including the "arbitrary" choices and the constraints that were invoked to make the propagator reduce the speculative propagation range of the variable). In the case where a variable is the subject of an "arbitrary" choice the speculative propagation range can be the "arbitrarily" chosen value of the variable and the explanation can be the variable itself. The speculative propagation range can maintain the progress of the propagation process. The speculative propagation range and the speculative propagation range explanations can be increasing or decreasing sets as the propagators reduce the speculative propagation range and the corresponding explanations get bigger or choices are taken back, or the propagator's work is at least partly taken back.

The search and speculative propagation ranges of a variable can be initialized to the initial range of the variable. An "arbitrary" choice for a value of a variable can be made and the choice can be propagated to the other variables. Each propagator can keep a union of explanations for its input and provides that explanation with each output. When a propagator outputs a new range for a variable, the intersection between the new range and the speculative propagation range of the variable can be calculated, and the speculative propagation range explanation can be the union of the explanations of the previous speculative propagation range explanation (e.g., the explanation before the reduction in the speculative propagation range) and the explanation of the output of the propagator. When one of the two ranges (e.g., the speculative propagation range and the new range) is a subset of the other than the explanation for the smaller range may be used as the speculative propagation range explanation. When the two ranges are equal, either of the two explanations can be taken. A heuristic can be created to determine which of the two explanations is to be taken.

At or around the time an "arbitrary" choice is made for variable, the proposed choice must be within the current search range, then the speculative propagation range can be updated to include only the choice of the value, the choice status can be updated to indicate that the corresponding variable is currently the subject of a choice, and the speculative propagation range explanation can be updated accordingly.

At or around the time the search range or the speculative propagation range of a variable becomes the empty set or a propagator signals a failure, a conflicting set of choices has been made. The conflict resolution process can remedy such conflicts. When the explanation of the conflict is empty, the problem is unsatisfiable and the conflict resolution process can indicate this. When the explanation of the conflict contains just one domain then the choice made for that domain is unconditionally infeasible. In such cases the conflict resolution process can reduce the initial range for that domain by removing that value. The unconditionally infeasible choice, or other choice, can be taken back through the backtracking process. An explanation for such backtracking can include an explanation that is the empty set. The lowest ranking variable that is a subject of an "arbitrary" choice that led to the conflict can have the "arbitrary" choice taken back. The remainder of the explanation of the conflicting set that is left after the choice is removed from the explanation of the conflicting set can be used as the explanation.

Taking back the "arbitrary" choice can include updating the choice status of the variable that was the subject of the "arbitrary" choice. The search range for the variable can be updated by removing the "arbitrary" choice from the search range set. The search range explanation can be updated with union of the existing search range explanation and the remainder of the explanation of the conflicting set that is left after the choice is removed from the explanation of the conflicting set. Other variables that have a search range explanation or a speculative propagation range explanation containing the "arbitrary" choice to be taken back can be updated accordingly. When a search range explanation of a variable includes the offending choice then the search range of the variable can be updated to the current value of the initial range. In such circumstances the search range explanation can be made empty. When a speculative propagation range explanation of a variable includes the "arbitrary" choice to be taken back the speculative propagation range of the variable can be set to the current search range of the variable and the speculative propagation range explanation of the variable can be set to the current search range explanation for the variable. When a propagator includes an output explanation that includes a variable that was affected in the process of taking back the "arbitrary" choice, the propagator can be cleared to start with empty input and output explanations. Propagators with input explanations that include a variable that was affected by the "arbitrary" choice being taken back can have an updated input that reflects the new search, propagation, or initial range of the variable that was affected by the "arbitrary" choice being taken back.

The variables can be put in a total ordering, such as by ranking the variables. Including variables that are in a total ordering can allow for deterministic conflict resolution, can allow a backtracking process to determine choice order from one or more explanations, and can allow for operation of a multithreaded embodiment of a constraint satisfaction problem solving algorithm. A variable can include a rank, not to be confused with the priority level related to the variable. For two variables of the same kind, but different related priority levels, the rank can agree with the priority levels. For two variables of the same kind and priority level the ranking can be a "tie-breaking" mechanism. It may not be important what the "tie-breaking" criterion is so long as any possible loops are eliminated.

Heuristics can be used by the search process to help make "arbitrary" choices, such as to guide the search process in making an "arbitrary" choice. Multiple heuristics for guiding the search process can be used. When multiple heuristics are used, individual heuristics can be run independently, sometimes in parallel. The choice of the heuristic(s) can affect how quickly the search process converges on a solution or whether the search process produces any useful intermediate results before it converges on a complete solution. For example, in a scheduling problem, a valid schedule for only high-priority constraints may be a desirable intermediate result.

When there are two constraints of the same priority and one of the constraints satisfied, but the other one is not, there may be a solution that satisfies both of the constraints. The ranks of the variables affected by the constraint can be changed, such as by swapping ranks, and the process can be run again to determine if such a solution is possible. In situations where ranks are changed to determine if a better solution exists, the process can be run again without running from scratch. The process can find one or more search ranges that include an explanation that includes a lower-ranking variable (the search process can ensure that does not happen, so when it does happen, the rank of a variable in the explanation must have been changed). For each such domain the process can reconstruct the conflicting set (including the variable plus the explanation of the variable that includes the search range explanation that includes a lower ranking variable), pick the new lowest-ranking variable that was the subject of an "arbitrary" choice, and take back the choice. For example, suppose that it was discovered that variables x and y are in conflict and only one of the related constraints Cx and Cy can be satisfied. Previously x had a higher ranking than y. As y was lower ranking, the search range of y was reduced to the empty set with a corresponding explanation Ey={x}. After the ranks of x and y are swapped then Ey includes a lower ranking variable (e.g., x). A conflict set can be reconstructed to include {x, y}. This conflict set includes a now lowest ranking variable x. The previous choice of picking x over y can be taken back and a search range, speculative propagation range, or initial range that includes variable y can be reset, this includes the search range, speculative propagation range, or initial range of y. This results in a search state where x is reduced to the empty set with an explanation Ex={y}, y is unrestricted, and the search process is free to satisfy Cy.

Implementation Considerations

At a branch point of a search process there can be a decision between two or more options. There are at least three ways to represent the options the search process can form: 1) a pair of propagators; 2) a domain split into two parts; or 3) a domain split into a single value and a remainder. The pair of propagators may be created, one for each way the search process may go next. The union of the two propagators can be verified to include the entire search tree. The propagators can be verified to be mostly exclusive (e.g., not too many of the same options remain on both branches corresponding to the two propagators). Splitting a domain into a single value and a remainder can be simpler and more efficient than the other two options.

When an "arbitrary" choice is taken back, variables with search or speculative propagation range explanations including the "arbitrary" choice can be reset. This can be kept track of using an explicit tracking method or by communicating that the "arbitrary" choice is being taken back along the same channels through which the "arbitrary" choice was propagated.

Explicit tracking can include having a variable affected by an "arbitrary" choice, registering itself with the variable that was the subject of the search decision. This way, at or around the time the "arbitrary" choice needs to be taken back, the variable that was the subject of the choice has a corresponding explanation that includes variables affected by the "arbitrary" choice.

Communicating that the "arbitrary" choice is being taken back along the same channels through which the "arbitrary" choice was propagated can include only allowing a propagator to have a fixed set of output variables. In such cases, taking back the "arbitrary" choice includes scanning the set of output variables for the variable that was the subject of the "arbitrary" choice and updating a speculative propagation range, search range, initial range, speculative propagation range explanation, search range explanation, or initial range explanation accordingly.

Communicating that the "arbitrary" choice is being taken back along the same channels through which the "arbitrary" choice was propagated can include allowing a propagator to include output variables based on the input variables to the propagator. In such cases, the variables can include a record of previous outputs of associated propagators. Taking back "arbitrary" choices includes scanning the record of previous outputs for the variable that was subject of the "arbitrary" choice to be taken back and updating speculative propagation ranges, search ranges, initial ranges, speculative propagation range explanations, search range explanations, and initial range explanations accordingly.

In some cases a propagator, either upstream or downstream, can be unaffected by a reversal, yet can still have their input or output variables altered by the reversal. The upstream or downstream propagators can be rerun after the "arbitrary" choice is taken back. Such propagators can be found by scanning the input variables and output variables of the propagator. When the propagator's output variables include the variable that was the subject of the "arbitrary" choice being taken back, but the propagator's input variables do not include that variable, then that propagator may be rerun. When each variable includes per-propagator and per-explanation range information, the information that is being taken back can be separated from the information that is still valid and the propagators to be rerun can be deduced.

A propagator can be dedicated to dynamically adding a constraint (e.g., adding a constraint during runtime). When a speculative propagation range includes only higher ranking variables, the search range can be intersected with the speculative propagation range and the corresponding search range explanation can be intersected with the speculative propagation range explanation. In cases where a search is constrained to only considering domains in strict rank order (e.g., instead of allowing "arbitrary" heuristics), the speculative propagation range or search range and the corresponding explanation may be removed. For search explanations of non-binary variables one explanation can be created and kept for all the removed values, or an explanation for each removed value can be created and kept. As opposed to keeping one explanation for all the removed values, including an explanation for each removed value can reduce backtracking runtime, increase conflict resolution complexity, or increase memory usage.

A heuristic for picking an explanation when a propagator outputs a range (e.g., search, initial, or speculative propagation range) that is equal to the current one, with a different corresponding explanation, can include: 1) finding the lowest-ranking "arbitrary" choice in the two explanations, the explanation with the higher-ranking lowest-ranking choice can be taken (e.g., higher-ranking choices may be less likely to be taken back); 2) when the lowest-ranking choices have the same rank, then the choice with the lower ranking explanation can be kept; 3) when the choices and corresponding explanations have the same rank, the explanation currently associated with the propagator can be kept.

A search heuristic can include trying to satisfy all constraints, trying to make partial solutions by concentrating on higher-priority domains until a partial solution emerges, or hybrid strategies can be implemented, such as by implementing multiple heuristics in parallel (e.g., one heuristic trying to reduce the search time and one heuristic trying to discover a partial solution).

Waiting for quiescence can be allowed to include waiting for a specific period of time and continuing the search process regardless of whether quiescence is reached. This can allow choices to percolate through the search tree, for a finite duration, before the search process continues. Waiting for quiescence can be allowed to include waiting for an approximate measure of the level of activity of a propagation process to drop below a specified threshold value. This can allow choices to percolate for a specific duration or a propagation process to settle down (e.g., reduce processor load or stabilize at least a little), before continuing the search process.

Tie-breaking options where a conflict exists can be explored to try to find the "best" solution. A "squeaky wheel" approach can be used where a variable that leads to conflicts more often than others has its rank reduced. When values for variables related to constraints with higher-priority levels have been determined and the search process has not settled upon a solution, the search process can take back choices to try to find a better solution, such as a solution that includes values for more variables related to constraints with higher-priority levels. A constraint problem solving module can do this during runtime.

Implementations of the algorithms discussed can be used in distributed environments. For example, a variable and its associated information (e.g., speculative propagation range, search range, speculative propagation range explanation, search range explanation, initial range, initial range explanation, etc.) can reside on an agent (e.g., a server) that is most affected by the variable. A propagator can reside on its own thread. A propagator can reside on an agent that introduced the underlying constraint or "arbitrary" choice that the propagator propagates. When a propagator reads the value of a variable from a different agent, the agent of the propagator can send a subscribe message to the different agent and receive the current value of the variable. The propagator can be automatically notified of any updates to the variable from the different agent.

Information related to a search decision can reside with the variable that is the subject of the decision (e.g., choice). An agent can subscribe to receive notification that a decision is being taken back when the agent includes a variable that is the subject of a choice or a variable that has an initial range, search range, or speculative propagation range that is affected by a choice (e.g., the agent includes a variable with an explanation that includes a variable that is subject to a choice that is to be taken back). That a choice is to be taken back can be communicated universally (e.g., to every agent or server).

Quiescence detection can be handled by a server, such as a server controlling the search or optimization process.

An agent may delegate search decisions for "important" variables to a search process running on a server. The agent may also run a local search heuristic for the remaining, "less-important," local variables.

Ranking may be assigned prior to beginning the search or optimization process. Ranking of same-kind, same-priority variables can be done, such as to same-kind, same-priority variables residing on different agents, such as to provide a variable set with a ranking that is a total order.

Agents may notify a server, such as a central optimization server, of a conflict where the outcome was affected by the ranking of a same-kind or same priority variable. The server can analyze these notifications and notify an agent of a change in ranking, such as to determine if a "better" solution exists.

DESCRIPTION OF FIGURES

FIG. 1 illustrates an example of an asynchronous constraint satisfaction problem solving system 100 ("ACSPSS"). The ACSPSS 100 can include an ACSPSM 102, one or more inputs 104, one or more processors 106A-C, or one or more outputs 108. While FIG. 1 depicts ACSPSS 100 as including two processors 106A-C, any number of processors, one or more, may be included in ACSPSS 100. Also, the processors 106A-C need not be local, the processors 106A-C could be remote, such as remote processors 106B-C coupled to processor 106A through a network. The processor 106 can be a server, such as a blade server or distributed server, or each processor could be a single core of a server.

The ACSPSM 102 is operable to provide an asynchronous framework for decentralized search and optimization for solving constraint satisfaction problems. The ACSPSM 102 can use a propagation-based approach to constraint satisfaction or an explanation-based approach to search or optimization. The ACSPSM 102 can be configured to receive a plurality of variables 210A-B or the at least one constraint from the input 104. The ACSPSM 102 can be configured to provide the output 108, such as a solution to the constraint satisfaction problem, such as a value for one or more variables of the plurality of variables 210A-B that satisfies at least one of the constraints.

The input 104 is operable to provide a plurality of variables 210, one or more constraints related to a variable of the plurality of variables 210, and initial ranges 214 of the plurality of variables 210 to the ACSPSM 102. The input 104 can provide the ACSPSM 102 with constraints during runtime.

The one or more processors 106A-C are operable to execute instructions to accomplish various tasks. The one or more processors 106A-C can allow for multiple threads to be executed simultaneously. Processor 106A (e.g., thread) can propagate at least one constraint to a variable 210A of the plurality of variables 210. Such propagation can include reducing a speculative propagation range 218 of a first variable 210A when a value of the first variable 210A in the speculative propagation range 218 is in conflict with the constraint. When a constraint is received after the ACSPSM 102 has begun working to solve the problem the processor 106A can be configured to propagate that constraint, such as during runtime.

Processor 106B can update an explanation 220A-E in accord with the reduction in the speculative propagation range 218. Processor 106B can backtrack when a choice of a second value for a second variable 210B of the plurality of variables 210 would result in the speculative propagation range 218A of the first variable 210A becoming the empty set.

Processor 106C can be configured to choose the second value for the second variable 210B. The second value can be chosen based on a heuristic and can be chosen from the search range 216A-B.

Figure 2:
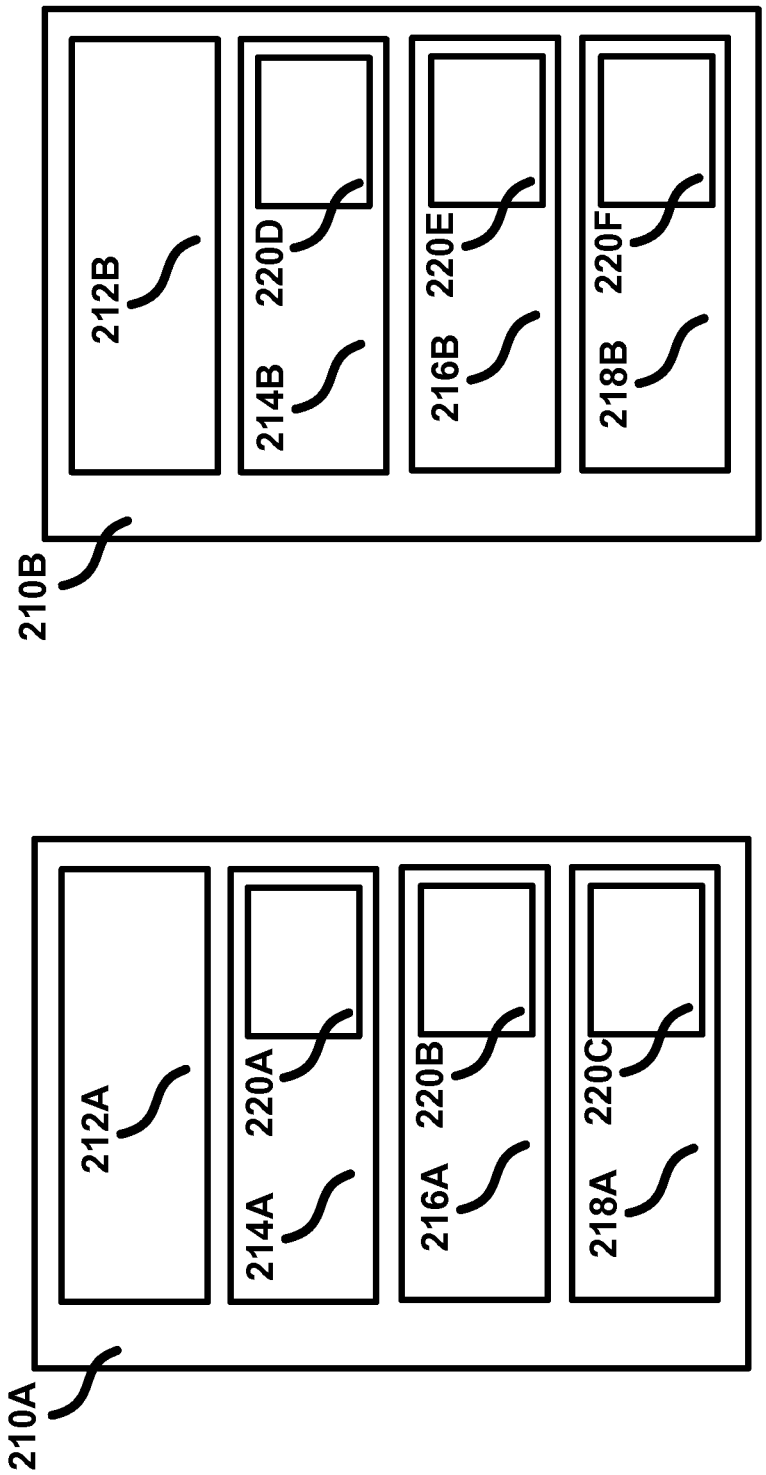
FIG. 2 illustrates a logical block diagram of an example of a variable.

FIG. 2 shows examples of a structure of the plurality of variables 210A-B. The variables 210A-B can include a choice status 212A-B, an initial range 214A-B, a search range 216A-B, or a speculative propagation range 218A-B. The initial range 214A-B, search range 216A-B, and the speculative propagation range 218A-B can include a corresponding explanation 220A-E that can include the history of the choices or constraints that led to the current state of the respective range. For example, if the speculative propagation range 218A of the first variable 210A was reduced because a constraint "first variable=second variable" and the second variable was the subject of a choice, then the corresponding explanation 220C can include {second variable}. The explanation 220 can be initialized to the empty set. In one or more embodiments an explanation can be a set of choices (e.g., a set of triples (V, X, i) where V is the variable the choice was made on, X is the value of the choice, and i is an index that represents the order the choice was made. For example, the variable V includes an initial range [1, 2, 3] with a choice heuristic of "decreasing order". The explanation for a choice of the value 3 for V could be (V, 3, 1), the value 2 for V could be (V, 2, 2), and the value 1 for V could be (V, 1, 3). In embodiments which include variables with rankings that are a total order there is a total order on the choices (e.g., lexical order (V,i)). At or around the time conflict resolution occurs, the explanation for the conflict can be given and the choice to be taken back can be minimum choice in the explanation, such as the minimum choice based on the total ordering of the choices.

The choice status 212A-B indicates whether the corresponding variable 210A-B is currently the subject of an "arbitrary" choice. The choice status 212A-B can be initialized to indicate that the corresponding variable 210A-B is not currently the subject of an "arbitrary" choice.

The initial range 214A-B is a set including all possible values of the variable 210A-B. If there is a conflict between a value in the initial range 214A-B and a constraint then the initial range 214A-B can be reduced to not include the value. For example, assume the initial range 214A of the first variable 210A includes {1, 2, 3, 4}, the initial range 214B of the second variable 210B includes {1, 2, 4}, and a constraint includes "first variable=second variable". The initial range 214A can be reduced by removing the value {3} from the set since the initial range 214B of the second variable 210B does not include the value {3}. The initial range 214A-B can be initialized to all possible values for the corresponding variable 210A-B.

The search range 216A-B can be a subset of the initial range 214A-B. The search range 216A-B can be reduced in a manner similar to the initial range 214A-B. The search range 216A-B can be reduced when an "arbitrary" choice is made for a variable 210A-B. The search range 216 can be initialized to be equal to the initial range 214 of the corresponding variable 210.

The speculative propagation range 218A-B can be a subset of the search range 216A-B. The speculative propagation range 218A-B can be reduced in a manner similar to the search range 216A-B. The speculative propagation range 218A-B can be reduced as "arbitrary" choices or constraints are propagated, such as during runtime. The speculative propagation range 218 can be initialized to the search range 216 or initial range 214 of the corresponding variable 210.

Figure 3:
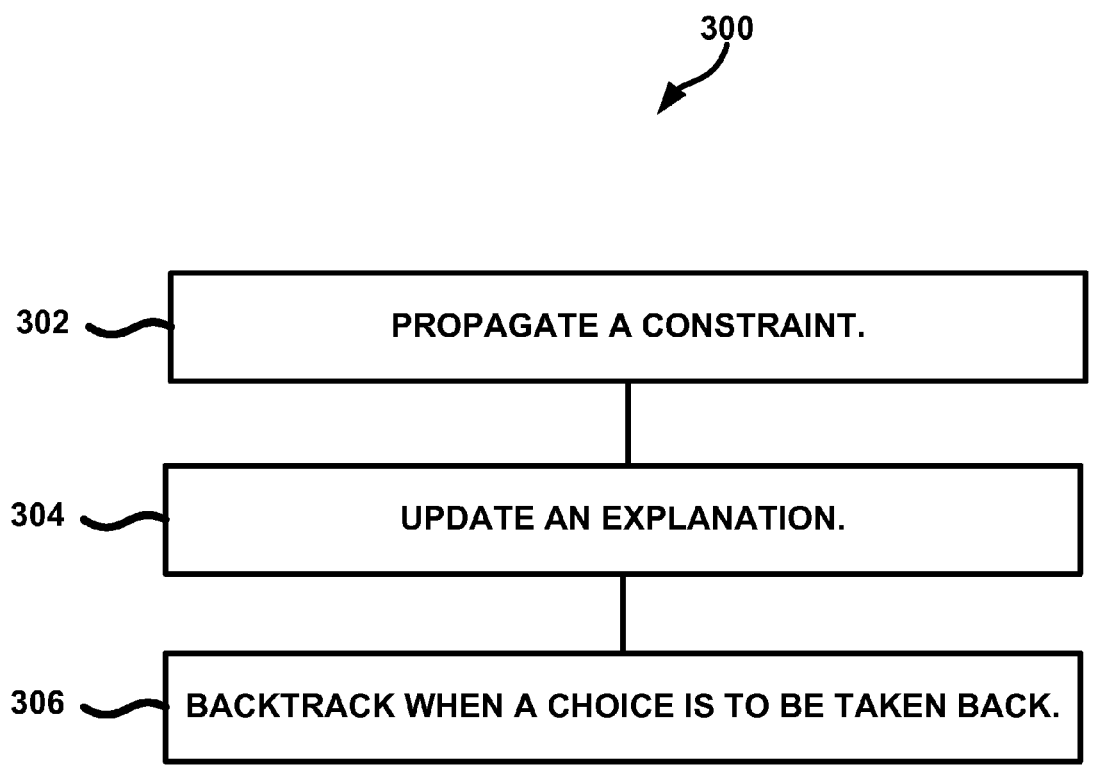
FIG. 3 illustrates an example of a technique for constraint problem solving.

FIG. 3 shows an example of a technique 300 for constraint problem solving. At 302, a constraint can be propagated, such as to a plurality of variables 210, such as by reducing a speculative propagation range 218 of a variable 210 when a value in the speculative propagation range 218 is in conflict with the constraint. At 304, an explanation 220 can be updated, such as by updating the explanation 220 to include the variable 210 or constraint that led to the reduction in the speculative propagation range 218. At 306, a choice can be taken back, such as by backtracking, such as when a speculative propagation range 218 of a variable 210 would become, or has become, the empty set.

Figure 4:
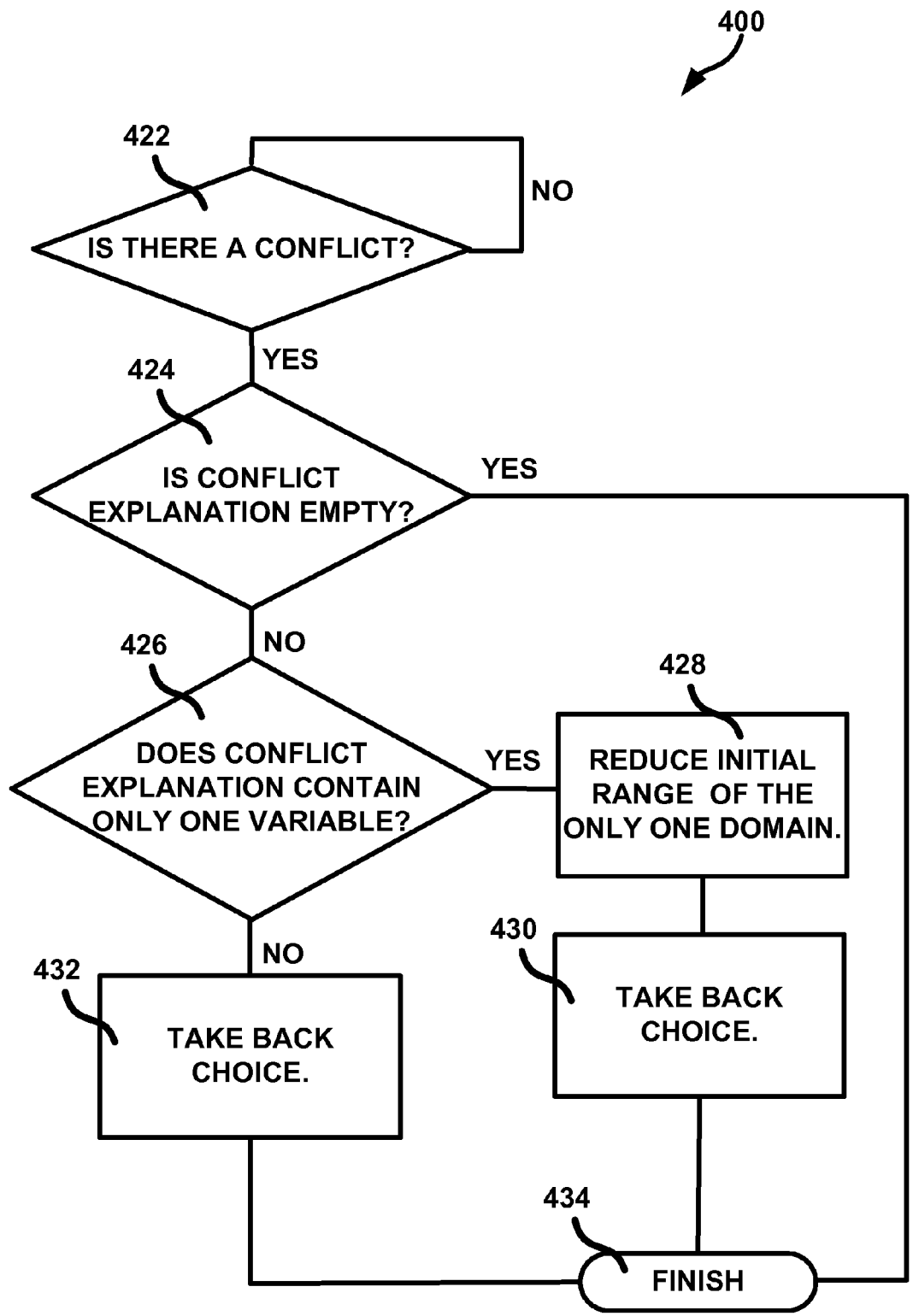
FIG. 4 illustrates an example of a technique for conflict resolution.

FIG. 4 shows a technique 400 for backtracking (e.g., resolving conflicts between "arbitrary" choices and constraints). At 422, it is determined if a conflict exists. If there is no conflict the technique 400 can loop until a conflict exists. If there is a conflict, an explanation 220 corresponding to the conflict can be analyzed. At 424, it can be determined if the explanation 220 for the conflict is the empty set. If the explanation 220 is the empty set then the problem is unsolvable or there is a bug in the program, and the technique 400 can terminate, such as by indicating to a user that the problem is unsolvable or there is a bug in the program. At 426, it is determined if the explanation 220 corresponding to the conflict includes only one variable 210. At 428, when the explanation 220 includes only one variable, the initial range 214 of the variable 210 is reduced, such as by removing the value of the variable 210 from the initial range 214 of the corresponding variable 210. At 430, when the explanation 220 includes only one variable 210, the choice of that value for the variable 210 can be taken back. At 432, when the explanation 220 includes more than one variable 210 a choice for the variable 210 can be taken back, such as taking back the choice for the lowest ranking variable 210 in the explanation 220 corresponding to the conflict.

Figure 5:
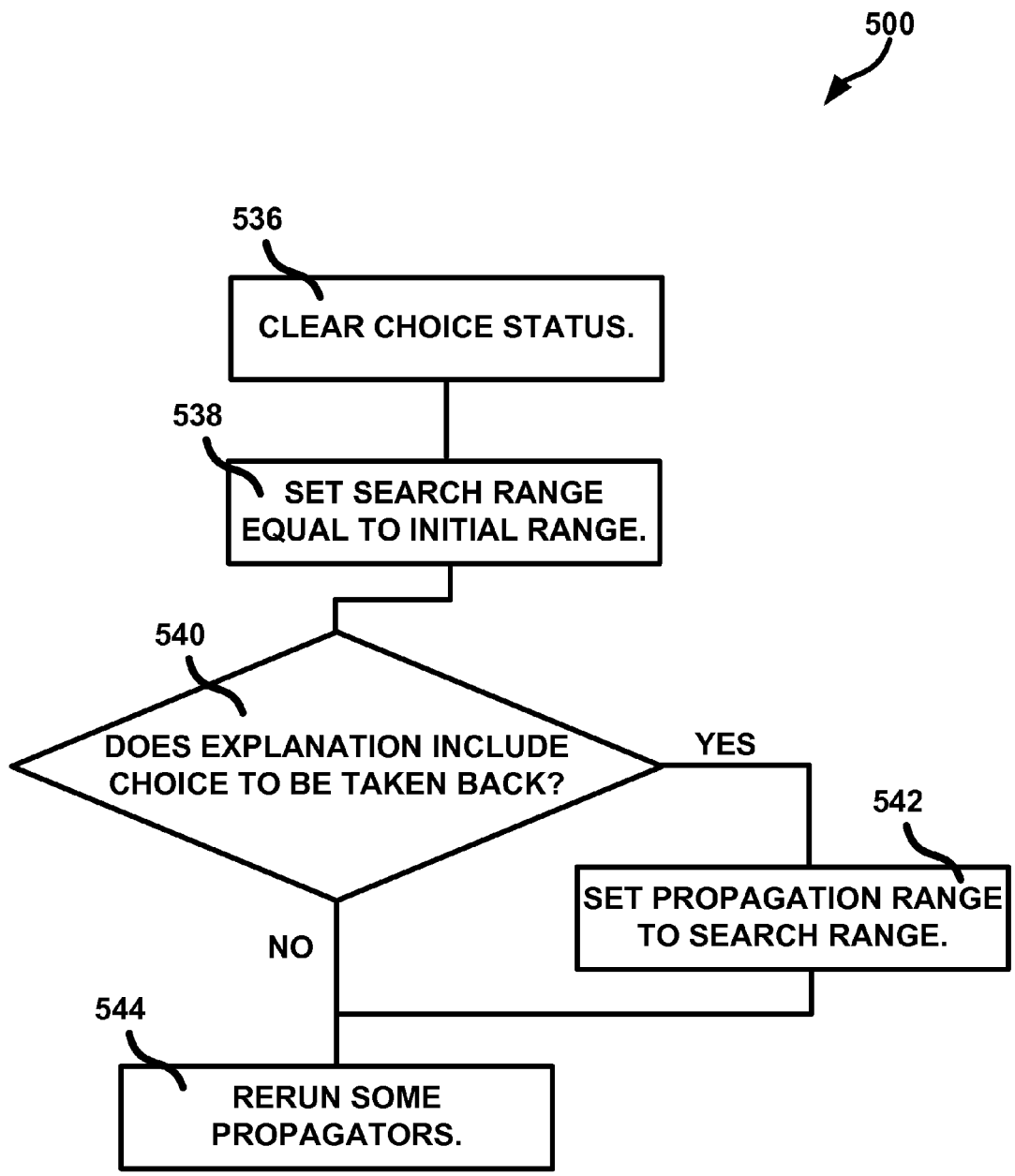
FIG. 5 illustrates an example of a technique for taking back a choice.

FIG. 5 shows an example of a technique 500 for taking back a choice of a value for a variable 210. At 536, the choice status 212 for the variable 210 that was the subject of the choice to be taken back can be cleared. At 538, the search range 216 of the variable 210 can be set equal to the initial range 214 of the variable 210. The corresponding explanation can be set equal to the empty set. At 540, it can be determined if an explanation 220, such as an explanation 220C corresponding to a speculative propagation range 218C of a variable 210A, includes the variable 210 that is the subject of the choice that is being taken back. At 542, when the explanation 220 includes the choice that is being taken back the speculative propagation range 218 of the variable 210 can be set to the search range 216 of the variable 210. At 544, one or more propagators can be rerun, such as propagators that include a variable 210 that was affected by the choice being taken back (e.g., by changing the search range 216, speculative propagation range 218, or initial range 214 in response to a choice being taken back) in their output variables. Propagators with inputs that were affected by the choice being taken back can be automatically rerun, such as a propagator whose input range has been altered by taking back the choice. Parts of this technique can occur for all variables with an An advantage of one or more embodiments may include the ability to execute a constraint-based problem solving algorithm on multiple threads, simultaneously. Another advantage may include an increased efficiency in solving constraint satisfaction problems.

Figure 6:
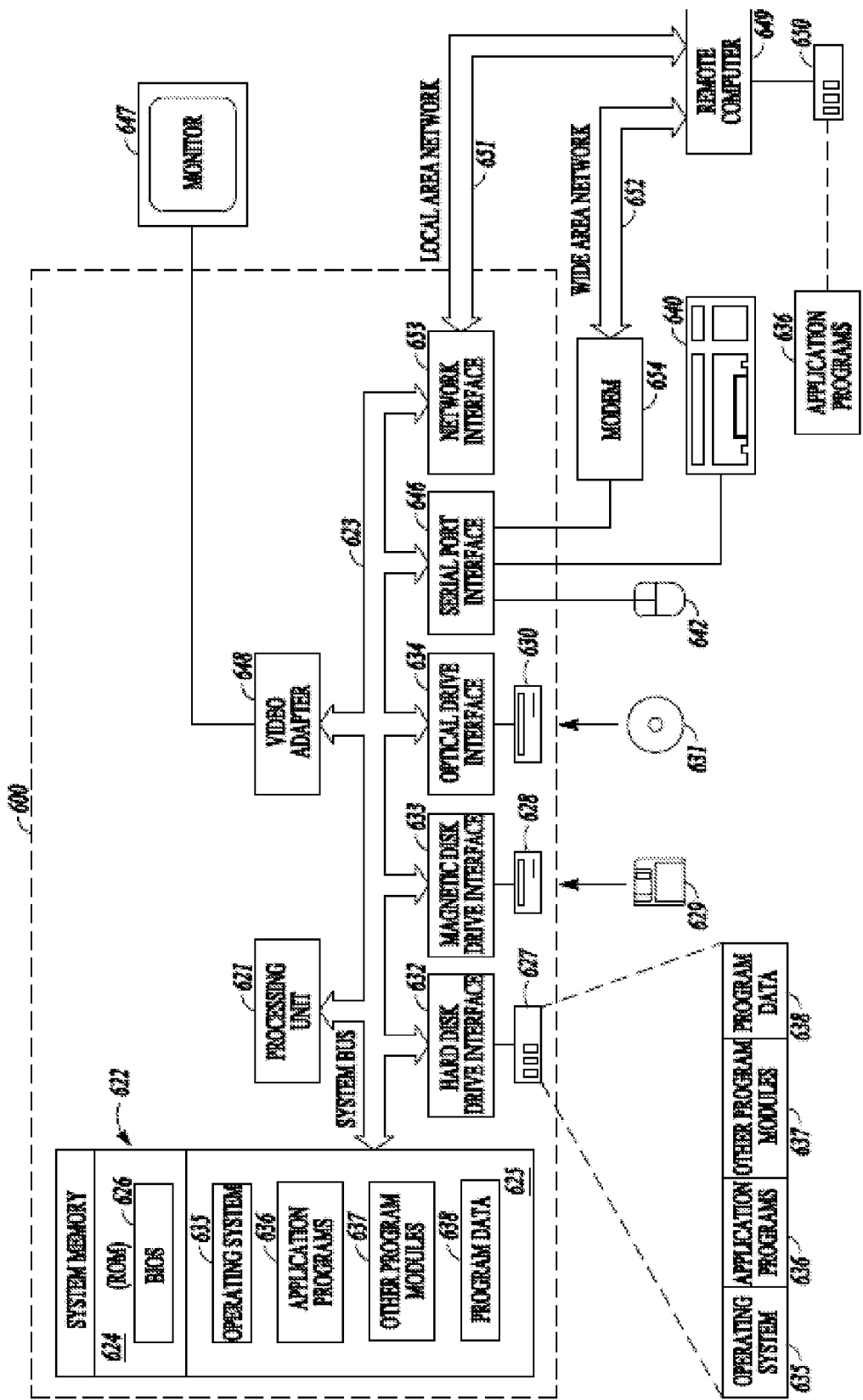
FIG. 6 illustrates a logical block diagram of an example of a computer system to implement methods.

FIG. 6 is a block diagram of a computer system to implement methods according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of one or more computers 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Examples and Additional Notes

In Example 1 an apparatus includes an asynchronous constraint satisfaction problem solving module, the asynchronous constraint satisfaction problem solving module executable by one or more processors.

In Example 2, the asynchronous constraint problem solving module of Example 1 is configured to propagate at least one constraint to a plurality of variables in a first thread by reducing a speculative propagation range of a first variable of the plurality of variables when a first value in the speculative propagation range of the first variable is in conflict with the constraint.

In Example 3, the asynchronous constraint problem solving module of at least one of Examples 1-2 is configured to update an explanation for the reduction in the speculative propagation range of the first variable.

In Example 4, the asynchronous constraint problem solving module of at least one of Examples 1-3 is configured to update an explanation for the reduction in the speculative propagation range of the first variable, in a second thread.

In Example 5, the asynchronous constraint problem solving module of at least one of Examples 1-4 is configured to backtrack when a choice of a second value for a second variable of the plurality of variables would result in the speculative propagation range of the first variable becoming the empty set.

In Example 6, the asynchronous constraint problem solving module of at least one of Examples 1-5 is configured to, in a second thread, backtrack when a choice of a second value for a second variable of the plurality of variables would result in the speculative propagation range of the first variable becoming the empty set.

In Example 7, the asynchronous constraint problem solving module of at least one of Examples 1-6 is configured to choose the second value for the second variable the value chosen based on a heuristic.

In Example 8, the asynchronous constraint problem solving module of at least one of Examples 1-7 is configured to choose the second value for the second variable in a third thread, the value chosen based on a heuristic.

In Example 9, the asynchronous constraint problem solving module of at least one of Examples 1-8 is configured to receive, during runtime, a new constraint.

In Example 10, the asynchronous constraint problem solving module of at least one of Examples 1-9 is configured to propagate, during runtime, the new constraint.

In Example 11, the asynchronous constraint problem solving module of at least one of Examples 1-10 is configured to propagate, during runtime, the new constraint in the first thread.

In Example 12, the asynchronous constraint problem solving module of at least one of Examples 1-11 is configured to receive the plurality of variables and the at least one constraint.

In Example 13, the asynchronous constraint problem solving module of at least one of Examples 1-12 is configured to choose the second value for the second variable, the choice made by selecting a value from a search range of the second variable.

In Example 14, the asynchronous constraint problem solving module of at least one of Examples 1-13 is configured to produce output including a solution value for the plurality of variables that satisfies one or more of: the at least one constraints and the new constraint.

In Example 15, the variable of at least one of Examples 1-14 includes a choice status indicating if the variable is the subject of the choice based on the heuristic.

In Example 16, the variable of at least one of Examples 1-15 includes an initial range including all possible values of the variable.

In Example 17, the variable of at least one of Examples 1-16 includes a search range that is a subset of the initial range of the variable, the search range reduced from the initial range through a backtracking process.

In Example 18, the variable of at least one of Examples 1-17 includes the speculative propagation range, the speculative propagation range a subset of the search range.

In Example 19, the variable of at least one of Examples 1-18 includes a speculative propagation range explanation, the explanation including a history of the choices and constraints that reduced the speculative propagation range.

In Example 20, the search range of at least one of Examples 1-19 is initialized to the initial range of the first variable.

In Example 21, the speculative propagation range of at least one of Examples 1-20 is initialized to the initial range of the first variable.

In Example 22, the speculative propagation range explanation of at least one of Examples 1-21 is initialized to the empty set.

In Example 23, the choice status of at least one of Examples 1-22 is initialized to indicate that the first variable is not currently the subject of a choice.

In Example 24, the backtracking of at least one of Examples 1-23 comprises: when the explanation indicates that the choice affects only the speculative propagation range of the first variable, reduce the search range of the second variable by removing the second value from the search range and undo all other reductions based on the choice of the second value for the second variable.

In Example 25, the backtracking of at least one of Examples 1-24 comprises: when the explanation indicates that the choice affects more than one speculative propagation range, take back the lowest ranking choice that led to the speculative propagation range of the first variable becoming the empty set.

In Example 26, a method comprises propagating, using a first processor, at least one constraint to a plurality of variables by reducing a speculative propagation range of a first variable of the plurality of variables when a first value in the speculative propagation range is in conflict with the constraint.

In Example 27, the method of at least one of Examples 1-26 includes updating, using a second processor, an explanation for the reduction in the speculative propagation range of the first variable.

In Example 28, the method of at least one of Examples 1-27 includes backtracking when a choice of a second value for a second variable of the plurality of variables would result in the speculative propagation range of the first variable becoming the empty set.

In Example 29, the method of at least one of Examples 1-28 includes choosing, using a third processor, the second value for the second variable based on a heuristic.

In Example 30, the method of at least one of Examples 1-29 includes receiving, during runtime, a new constraint.

In Example 31, the method of at least one of Examples 1-30 includes propagating, during runtime, the new constraint in the first thread.

In Example 32, the method of at least one of Examples 1-31 includes receiving the plurality of variables and the at least one constraint.

In Example 33, the method of at least one of Examples 1-32 includes choosing a value for the second variable, the choice made by selecting a value from a search range of the second variable.

In Example 34, the method of at least one of Examples 1-33 includes producing an output including a solution value for the plurality of variables that satisfies one or more of: the at least one constraint and the new constraint.

In Example 35, the method of at least one of Examples 1-34 includes receiving an initial range for a variable of the plurality of variables, the initial range including all possible values for the variable.

In Example 36, the method of at least one of Examples 1-35 includes creating a choice status for the variable, the choice status indicating if the variable is the subject of the choice based on the heuristic.

In Example 37, the method of at least one of Examples 1-36 includes creating a search range for the variable, the search range a subset of the initial range of the variable, the search range reduced from the initial range through the backtracking process.

In Example 38, the method of at least one of Examples 1-37 includes creating the speculative propagation range for the variable, the speculative propagation range a subset of the search range of the variable, the speculative propagation range including a corresponding speculative propagation range explanation, the speculative propagation range explanation including a history of the choices and constraints that reduced the speculative propagation range of the variable.

In Example 39, the method of at least one of Examples 1-37 includes initializing the search range of the first variable to the initial range of the first variable.

In Example 40, the method of at least one of Examples 1-39 includes initializing the speculative propagation range of the first variable to the initial range of the first variable.

In Example 41, the method of at least one of Examples 1-40 includes initializing the explanation of the speculative propagation range of the first variable to the empty set.

In Example 42, the method of at least one of Examples 1-41 includes initializing the choice status of the first variable to indicate that the first variable is not currently the subject of a choice.

In Example 43, the backtracking of at least one of Examples 1-42 includes when the explanation indicates that the choice affects only the speculative propagation range of the first variable, reducing the search range of the second variable by removing the second value from the search range and undo all other reductions based on the choice of the second value for the second variable.

In Example 44, the backtracking of at least one of Examples 1-43 includes when the explanation indicates that the choice affects more than one speculative propagation range, taking back the lowest ranking choice that led to the speculative propagation range of the first variable becoming the empty set.

In Example 45 a machine readable storage device that stores instructions, the instructions, which when performed by a machine, cause the machine to perform operations for asynchronous constraint satisfaction problem solving, including propagating, using a first processor, at least one constraint to a plurality of variables by reducing a speculative propagation range of a first variable of the plurality of variables when a first value in the speculative propagation range is in conflict with the constraint.

In Example 46, the machine readable storage device of at least one of Examples 1-45 includes instructions, which when performed by the machine, cause the machine to perform operations including updating, using a second processor, an explanation for the reduction in the speculative propagation range of the first variable.

In Example 47, the machine readable storage device of at least one of Examples 1-46 includes instructions, which when performed by the machine, cause the machine to perform operations including backtracking when a choice of a second value for a second variable of the plurality of variables would result in the speculative propagation range of the first variable becoming the empty set.

In Example 48, the machine readable storage device of at least one of Examples 1-47 includes instructions, which when performed by the machine, cause the machine to perform operations including choosing, using a third processor, the second value for the second variable based on a heuristic.

In Example 49, the machine readable storage device of at least one of Examples 1-48 includes instructions, which when performed by the machine, cause the machine to perform operations including receiving, during runtime, a new constraint.

In Example 50, the machine readable storage device of at least one of Examples 1-49 includes instructions, which when performed by the machine, cause the machine to perform operations including propagating, during runtime, the new constraint in the first thread.

In Example 51, the machine readable storage device of at least one of Examples 1-50 includes instructions, which when performed by the machine, cause the machine to perform operations including receiving the plurality of variables and the at least one constraint; choosing a value for the second variable, the choice made by selecting a value from a search range of the second variable; or producing output including a solution value for the plurality of variables that satisfies one or more of: the at least one constraint and the new constraint.

In Example 52, the instructions for backtracking when a choice of a second value for a second variable of the plurality of variables would result in the speculative propagation range of the first variable becoming the empty set of at least one of Examples 1-51 include instructions which when performed by the machine, cause the machine to perform operations including when the explanation indicates that the choice affects only the speculative propagation range of the first variable, reducing the search range of the second variable by removing the second value from the search range and undo all other reductions based on the choice of the second value for the second variable.

In Example 53, the instructions for backtracking when a choice of a second value for a second variable of the plurality of variables would result in the speculative propagation range of the first variable becoming the empty set of at least one of Examples 1-52 include instructions which when performed by the machine, cause the machine to perform operations including when the explanation indicates that the choice affects more than one speculative propagation range, taking back the lowest ranking choice that led to the speculative propagation range of the first variable becoming the empty set.

In Example 54, the machine readable storage device of at least one of Examples 1-53 includes instructions, which when performed by the machine, cause the machine to perform operations including receiving an initial range for a variable of the plurality of variables, the initial range including all possible values for the variable.

In Example 55, the machine readable storage device of at least one of Examples 1-54 includes instructions, which when performed by the machine, cause the machine to perform operations including creating a choice status for the variable, the choice status indicating if the variable is the subject of the choice based on the heuristic.

In Example 56, the machine readable storage device of at least one of Examples 1-55 includes instructions, which when performed by the machine, cause the machine to perform operations including creating a search range for the variable, the search range a subset of the initial range of the variable, the search range reduced from the initial range through the backtracking process.

In Example 57, the machine readable storage device of at least one of Examples 1-56 includes instructions, which when performed by the machine, cause the machine to perform operations including creating the speculative propagation range for the variable, the speculative propagation range a subset of the search range of the variable, the speculative propagation range including an explanation, the explanation including a history of the choices and constraints that reduced the initial range of the variable to the speculative propagation range of the variable.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the disclosed subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The functions or algorithms described herein are implemented in hardware, software, or a combination of software and hardware in some embodiments. The software can comprise computer executable instructions stored on computer readable media such as memory or other type of storage devices. Further, described functions can correspond to modules, which can be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, process flows can be applicable to software, firmware, and hardware implementations.

Systems and methods of the present disclosure can be implemented on a mobile device as a mobile application, web-based application, on a desktop computer as a computer application, or a combination thereof. A mobile application can operate on a Smartphone, tablet computer, portable digital assistant (PDA), ruggedized mobile computer, or other mobile device. The mobile device can be connected to the Internet or network via Wi-Fi, Wide Area Network (WAN), cellular connection, WiMax, Serial Front Panel Data Port (Serial FPDP), Rapid I/O (Input/Output) Transport, or any other type of wired or wireless method of networking connection. In some embodiments, a web-based application can be delivered as a software-as-a-service (SaaS) package (e.g., cloud-based embodiments) accessible via a device app, a web browser application, or other suitable application, depending on the particular embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. An apparatus comprising:
an asynchronous constraint satisfaction problem solving module, the asynchronous constraint satisfaction problem solving module executable by one or more processors, the asynchronous constraint problem solving module configured to:
assign a priority level and a rank to each variable of a plurality of variables such that no two variables include both a same priority level and a same rank;
propagate at least one constraint to the plurality of variables in a first thread by reducing a speculative propagation range of a first variable of the plurality of variables when a first value in the speculative propagation range of the first variable is in conflict with the constraint; and
in a second thread, (1) update an explanation for the reduction in the speculative propagation range of the first variable, and (2) backtrack when a choice of a second value for a second variable of the plurality of variables would result in the speculative propagation range of the first variable becoming the empty set, wherein backtracking includes taking back a choice associated with a variable with a lowest priority level and if two choices are associated with respective variables assigned the same priority level then backtracking includes taking back the choice associated with the variable of the respective variables assigned a lower rank.

2. The apparatus of claim 1, wherein the asynchronous constraint satisfaction problem solving module is configured to:
choose the second value for the second variable in a third thread, the value chosen based on a heuristic.

3. The apparatus of claim 1, wherein the asynchronous constraint satisfaction problem solving module is configured to:
receive, during runtime, a new constraint; and
propagate, during runtime, the new constraint in the first thread.

4. The apparatus of claim 3, wherein the asynchronous constraint satisfaction problem solving module is configured to:
receive the plurality of variables and the at least one constraint;
choose the second value for the second variable, the choice made by selecting a value from a search range of the second variable; and
produce output including a solution value for the plurality of variables that satisfies one or more of: the at least one constraints and the new constraint.

5. The apparatus of claim 2, wherein each variable of the plurality of variables includes:
a choice status indicating if the variable is the subject of the choice based on the heuristic;
an initial range including all possible values of the variable;
a search range that is a subset of the initial range of the variable, the search range reduced from the initial range through a backtracking process; and
the speculative propagation range, the speculative propagation range a subset of the search range, the speculative propagation range including an explanation, the explanation including a history of the choices and constraints that reduced the speculative propagation range of the variable.

6. The apparatus of claim 5, wherein;
the search range of the first variable is initialized to the initial range of the first variable;
the speculative propagation range of the first variable is initialized to the initial range of the first variable;
the explanation of the speculative propagation range of the first variable is initialized to the empty set; and
the choice status of the first variable is initialized to indicate that the first variable is not currently the subject of a choice.

7. The apparatus of claim 5, wherein backtracking comprises:
when the explanation indicates that the choice affects only the speculative propagation range of the first variable, reduce the search range of the second variable by removing the second value from the search range and undo all other reductions based on the choice of the second value for the second variable.

8. A computer implemented method comprising:
assigning a priority level and rank to each variable of a plurality of variables such that no two variables include both a same priority level and a same rank;
propagating, using a first processor, at least one constraint to the plurality of variables by reducing a speculative propagation range of a first variable of the plurality of variables when a first value in the speculative propagation range is in conflict with the constraint; and
updating, using a second processor, an explanation for the reduction in the speculative propagation range of the first variable; and
backtracking when a choice of a second value for a second variable of the plurality of variables would result in the speculative propagation range of the first variable becoming the empty set, wherein backtracking includes taking back a choice associated with a variable with a lowest priority level and if two choices are associated with respective variables assigned the same priority level then taking back the choice associated with a variable of the respective variables assigned a lower rank.

9. The method of claim 8, comprising:
choosing, using a third processor, the second value for the second variable based on a heuristic.

10. The method of claim 8, comprising:
receiving, during runtime, a new constraint; and
propagating, during runtime the new constraint in the first thread.

11. The method of claim 10, comprising:
receiving the plurality of variables and the at least one constraint;
choosing a value for the second variable, the choice made by selecting a value from a search range of the second variable; and
producing an output including a solution value for the plurality of variables that satisfies one or more of: the at least one constraint and the new constraint.

12. The method of claim 11, comprising
receiving an initial range for a variable of the plurality of variables, the initial range including all possible values for the variable;
creating a choice status for the variable, the choice status indicating if the variable is the subject of the choice based on the heuristic;
creating a search range for the variable, the search range a subset of the initial range of the variable, the search range reduced from the initial range through the backtracking process; and
creating the speculative propagation range for the variable, the speculative propagation range a subset of the search range of the variable, the speculative propagation range including an explanation, the explanation including a history of the choices and constraints that reduced the initial range of the variable to the speculative propagation range of the variable.

13. The method of claim 12, comprising:
initializing the search range of the first variable to the initial range of the first variable;
initializing the speculative propagation range of the first variable to the initial range of the first variable;
initializing the explanation of the speculative propagation range of the first variable to the empty set; and
initializing the choice status of the first variable to indicate that the first variable is not currently the subject of a choice.

14. The method of claim 13, wherein backtracking when a choice of a second value for a second variable of the plurality of variables would result in the speculative propagation range of the first variable becoming the empty set includes:
when the explanation indicates that the choice affects only the speculative propagation range of the first variable, reducing the search range of the second variable by removing the second value from the search range and undo all other reductions based on the choice of the second value for the second variable.

15. A non-transitory machine readable storage device that stores instructions, the instructions, which when performed by a machine, cause the machine to perform operations for asynchronous constraint satisfaction problem solving, comprising:
  assigning a priority level and a rank to each variable of a plurality of variables such that no two variables include both a same priority level and a same rank;
  propagating, using a first processor, at least one constraint to the plurality of variables by reducing a speculative propagation range of a first variable of the plurality of variables when a first value in the speculative propagation range is in conflict with the constraint; and
  updating, using a second processor, an explanation for the reduction in the speculative propagation range of the first variable; and
  backtracking when a choice of a second value for a second variable of the plurality of variables would result in the speculative propagation range of the first variable becoming the empty set, wherein backtracking includes taking back a choice associated with a variable with a lowest priority level and if two choices are associated with respective variables assigned the same priority level then taking back the choice associated with a variable of the respective variables assigned a lower rank.

16. The machine readable storage device of claim 15, wherein the instructions include instructions which when performed by the machine, cause the machine to perform operations comprising:
  choosing, using a third processor, the second value for the second variable based on a heuristic.

17. The machine readable storage device of claim 15, wherein the instructions include instructions which when performed by the machine, cause the machine to perform operations comprising:
  receiving, during runtime, a new constraint; and
  propagating, during runtime, the new constraint in the first thread.

18. The machine readable storage device of claim 15, wherein the instructions include instructions which when performed by the machine, cause the machine to perform operations comprising:
  receiving the plurality of variables and the at least one constraint;
  choosing a value for the second variable, the choice made by selecting a value from a search range of the second variable; and
  producing output including a solution value for the plurality of variables that satisfies one or more of: the at least one constraint and the new constraint.

19. The machine readable storage device of claim 15, wherein the instructions for backtracking when a choice of a second value for a second variable of the plurality of variables would result in the speculative propagation range of the first variable becoming the empty set include instructions which when performed by the machine, cause the machine to perform operations comprising:
  when the explanation indicates that the choice affects only the speculative propagation range of the first variable, reducing the search range of the second variable by removing the second value from the search range and undo all other reductions based on the choice of the second value for the second variable.

20. The machine readable storage device of claim 18, wherein the instructions include instructions which when performed by the machine, cause the machine to perform operations comprising:
  receiving an initial range for a variable of the plurality of variables, the initial range including all possible values for the variable;
  creating a choice status for the variable, the choice status indicating if the variable is the subject of the choice based on the heuristic;
  creating a search range for the variable, the search range a subset of the initial range of the variable, the search range reduced from the initial range through the backtracking process; and
  creating the speculative propagation range for the variable, the speculative propagation range a subset of the search range of the variable, the speculative propagation range including an explanation, the explanation including a history of the choices and constraints that reduced the initial range of the variable to the speculative propagation range of the variable.

* * * * *

UNITED STATES PATENT AND TRADEMARK OFFICE
CERTIFICATE OF CORRECTION

PATENT NO. : 9,147,160 B2
APPLICATION NO. : 13/744657
DATED : September 29, 2015
INVENTOR(S) : Aleksey Nogin It is certified that error appears in the above-identified patent and that said Letters Patent is hereby corrected as shown below:

In The Specification

In column 12, line 53, delete "wide-area" and insert --wide area--, therefor

In The Claims

In column 19, line 30, in Claim 4, delete "of;" and insert --of:--, therefor

In column 20, line 23, in Claim 10, delete "runtime" and insert --runtime,--, therefor In column 20, line 34, in Claim 12, after "comprising", insert --:--, therefor Signed and Sealed this
First Day of March, 2016

Michelle K. Lee
*Director of the United States Patent and Trademark Office*